United States Patent [19]
Bang

[11] Patent Number: 5,987,542
[45] Date of Patent: Nov. 16, 1999

[54] SERIAL INTERFACE CIRCUIT FOR ADAPTIVELY SUPPORTING THE SERIAL INTERFACE OF READ/WRITE CHANNEL CIRCUITS IN A MAGNETIC DISK DRIVE

[75] Inventor: Ho-Yul Bang, Suwon, Rep. of Korea

[73] Assignee: SamSung Electronics Co., Ltd., Kyungki-do, Rep. of Korea

[21] Appl. No.: 08/933,852

[22] Filed: Sep. 19, 1997

[30] Foreign Application Priority Data

Sep. 21, 1996 [KR] Rep. of Korea ......... 96-41480

[51] Int. Cl.$^6$ ................... G06F 13/00
[52] U.S. Cl. ............ 710/65; 710/62; 710/74
[58] Field of Search ............ 395/882, 883, 395/884, 892–894, 830, 831; 371/21; 360/67; 710/58–74; 711/111–112

[56] References Cited

U.S. PATENT DOCUMENTS

| | | |
|---|---|---|
| 4,071,887 | 1/1978 | Daly et al. . |
| 4,901,275 | 2/1990 | Hardie et al. . |
| 5,023,829 | 6/1991 | Shibata ........................ 395/853 |
| 5,349,350 | 9/1994 | Blagaila ....................... 341/59 |
| 5,726,821 | 3/1998 | Cloke et al. ................. 360/67 |
| 5,812,560 | 9/1998 | Yuki .......................... 371/21.2 |

*Primary Examiner*—Christopher B. Shin
*Attorney, Agent, or Firm*—Robert E. Bushnell, Esq.

[57] ABSTRACT

A serial interface circuit for interfacing serial data between a control unit and a read/write channel circuit of a magnetic disk drive, includes a bit control data loading unit for loading the serial data to interface with the read/write channel circuit of a specified standard and the bit control data related to the transfer control signal of the serial data under the control of the control unit, and a serial interface control circuit for supplying the serial data to the read/write channel circuit by performing the bit conversion to adapt to the serial data, controlling the polarity and edge of the transfer control signal, and controlling the bit conversion by employing the loaded bit control data.

3 Claims, 5 Drawing Sheets

SERIAL INTERFACE CIRCUIT FOR ADAPTIVELY SUPPORTING THE SERIAL INTERFACE OF READ/WRITE CHANNEL CIRCUITS IN A MAGNETIC DISK DRIVE

CLAIM OF PRIORITY

This application makes reference to, incorporates the same herein, and claims all benefits accruing under 35 U.S.C. §119 from an application for *SERIAL INTERFACE CIRCUIT* earlier filed in the Korean Industrial Property Office on the 21$^{th}$ of Sep. 1996 and there duly assigned Serial No. 41480/1996.

BACKGROUND OF THE INVENTION

1. Field of the Invention

The present invention relates to a magnetic disk drive, and more particularly, to a serial interface circuit for adaptively supporting the serial interface of the read/write channel circuits of various standards.

2. Description of the Related Art

Recently the data storing and retrieving technique is rapidly and greatly improved to manufacture high-capacity and high-speed storage devices like hard disk drives widely employed as auxiliary storage devices for computer systems.

In the magnetic disk drives, the read/write channel circuit detects and decodes data pulses from read signals transmitted by the preamplifier coupled to heads so as to transfer the to the DDC (disk data controller) and conversely decodes write data from the DDC and supplies it to the preamplifier. When retrieving data, the preamplifier amplifies signals picked-up by the heads from the disks (recording medium) so as to supply them to the read/write channel circuit, and when recording data, selects a head in response to an instruction from the DDC so as to record the encoded write data received from the read/write channel circuit on the corresponding disk.

The read/write channel circuit controls the internal constituent circuits through an internal built-in serial port under the control of a central processing unit (CPU). Various states of a read/write channel circuit are transferred through the serial port to the CPU. Namely, the above serial port is a bidirectional port which serially interfaces between the read/write channel circuit and the CPU.

By way of example, a read/write channel circuit includes an ENcoder/DECoder(ENDEC) which decodes recording data and encodes synchronous reading data, a pulse and servo detector which detects amplitudes of bursts to generate position error signals and detects peak values of amplitudes of the preamplified signals, and a data separator which separates read data synchronized with specific clocks from data pulses generated by the pulse and servo detector, and further includes an automatic gain control (AGC) circuit, a programmable filter, a hysteresis qualifier, etc. Each of the internal circuits has respective registers for storing information used for operation controls of the corresponding circuit.

The built-in serial port in the read/write channel circuit has n number of serial port registers (hereinafter referred to as "state control registers"). For example, n number of state control registers are respective registers for setting power-down, data mode cut-off, servo mode cut-off, filter boost, data threshold value, servo threshold value, data restoring, and AGC level, etc. Each of the registers has a specific control value for setting the corresponding functions.

The CPU supplies the serial port control signals, i.e. SDEN, SDATA and SCLK, to the above serial port, where SDEN is a data transmission enabling signal, and SDATA is serial data of CPU, and SCLK is a serial clock signal. The SDATA carries the address for selecting the specified state control register of the serial port and the data for reading (or writing) the control state of the register selected by the above address. The address of the serial data includes the read/write selection bits for controlling the data reading and/or writing selections.

When the serial port control signal is supplied, the CPU accesses to the state control register according to the address in the serial data SDATA and reads (or writes) the control state from (or to) the register accessed according to the data in the SDATA. The read or write selection is performed according to the binary logic state of the read/write selection bit in the address. If the control state is written, the serial port loads the above control state on the corresponding internal circuit of the read/write channel circuit. If the control state is read, the serial port loads the current control state of the accessed state control register on the serial data SDATA to transfer it to the CPU.

Since the read/write channel circuit is packed in a single chip specially designed by manufacturers, it is natural that the bit numbers of the serial ports for interfacing between the read/write channel circuit and the CPU are different depending on manufacturers. The bit numbers of the serial ports are for example 16 bits, 18 bits and 8 bits which mean a variety of serial port implementations.

In order to serially interface between earlier read/write channel circuits of various standards and the CPU, the related control designs of the CPU or DSP (digital signal processor) must be modified by adapting to the bit number of the serial port of the read/write channel circuit. Accordingly, to remove such inconveniences, it is desired to devise a serial interface circuit adapting to the read/write channel circuits of various standards.

The patent to Daly et al., U.S. Pat. No. 4,071,887, entitled Synchronous Serial Data Adaptor, discloses an integrated circuit synchronous data adaptor for providing a bidirectional interface for a synchronous data interchange.

The patent to Hardie et al., U.S. Pat. No. 4,901,275, entitled analog Data Acquisition apparatus And Method Provided With Electro-Optical Isolation, discloses a unit for providing an interface between analog input signals and a digital data processing system bus.

SUMMARY OF THE INVENTION

It is an object of the present invention to provide a serial interface circuit for adaptively supporting the serial interface between the CPU and the read/write channel circuits of various standards.

It is another object of the present invention to provide an adaptive serial interface circuit capable of controlling the serial interface up to 2n bits (n is a natural number) between the CPU and the read/write channel circuit.

It is further another object of the present invention to provide an adaptive serial interface circuit without necessitating the modification of the related control design of the control unit of the magnetic disk drive despite different designs of the read/write channel circuits.

According to an embodiment of the present invention, a serial interface circuit for interfacing the serial data between the control unit and read/write channel circuit of a magnetic disk drive comprises a bit control data loading unit for loading the serial data to interface with the read/write channel circuit of a specified standard and the bit control data related to the transfer control signal of the serial data under the control of the control unit, and a serial interface control circuit for supplying the serial data to the read/write channel circuit by performing the bit conversion to adapt to the serial data, controlling the polarity and edge of the transfer control signal, and controlling the bit conversion by employing the loaded bit control data.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

For the better understanding of the serial interface circuit according to the embodiment of the present invention, the construction of the earlier hard disk drive is first described with reference to FIG. 5.

Figure 5:
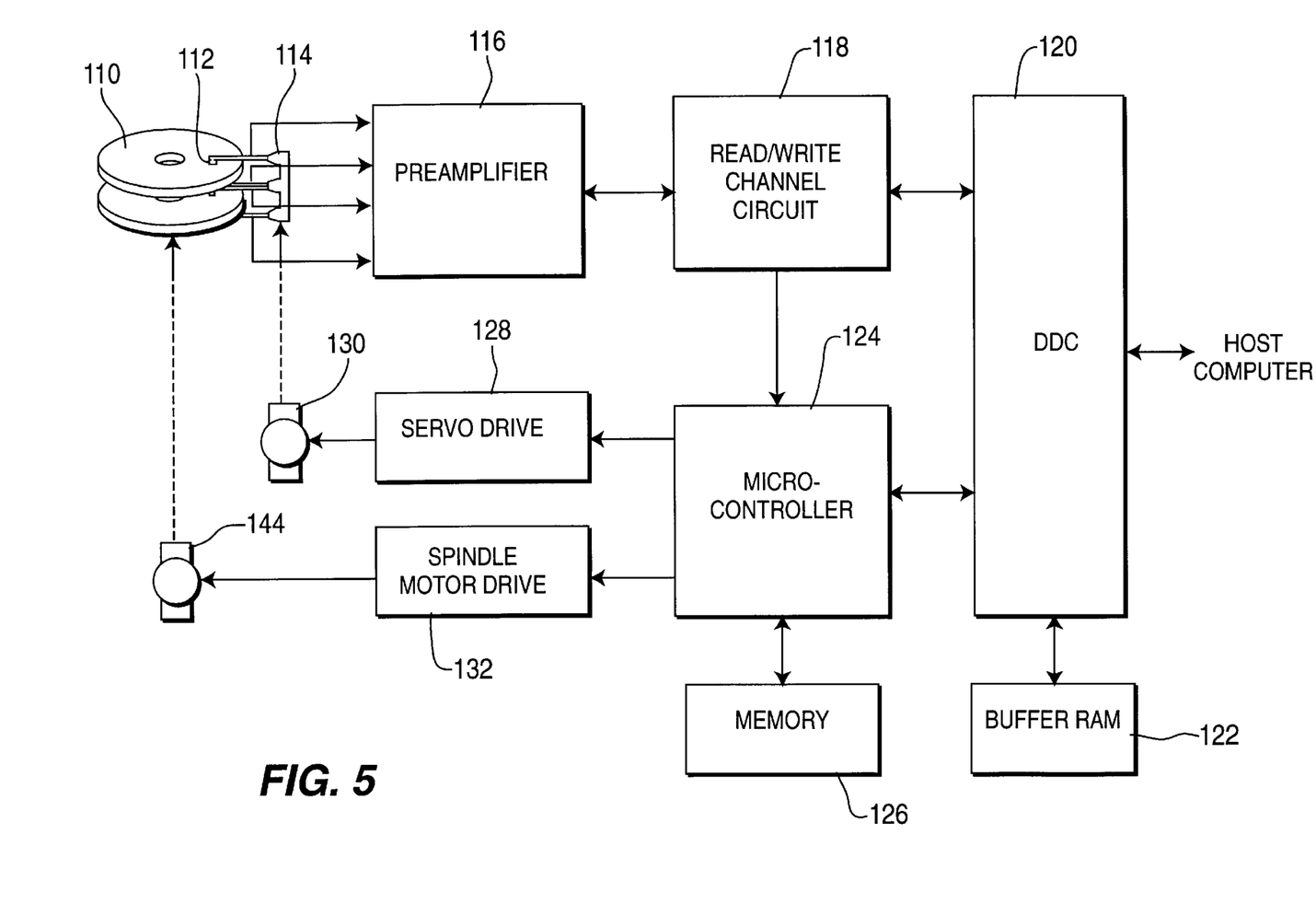
FIG. 5 is a block diagram illustrating an earlier hard disk drive.

Referring to FIG. 5, the disks 110 are rotated by a spindle motor 144. The heads 112 are each mounted on the respective support arms extending from the E-block assembly 114 coupled to the rotary voice coil actuator 130 and each head is positioned over the corresponding disk surface of disks 110. When reading, the preamplifier 116 amplifies the signals picked up by one of the heads 112 on to supply the analog read signal to the read/write channel circuit, and when writing, the preamplifier 116 writes the encoded write data received from the read/write channel circuit through the corresponding head 112 onto the disk 110. The read/write channel circuit detects and decodes the data pulses from the read signals supplied by the preamplifier 116 to transmit them to the disk data controller (DDC) 120, and conversely, decodes the write data received from the DDC 120 so as to supply them to the preamplifier 116.

The DDC 120 writes data received from the host computer through the read/write channel circuit and the preamplifier 116 on the disks and conversely, reads data from the disks to transfer it to the host computer. Further, the DDC 120 interfaces bidirectional communications between the host computer and the microcontroller 124. The buffer RAM 122 temporarily stores data transmitted between the host computer and both the microcontroller 124 and the read/write channel circuit 118. The microcontroller 124 controls the track seeking and following operations in response to the read or write instructions received from the host computer. The memory 126 stores execution programs and various setting values of the microcontroller 124.

The servo drive 128 generates the drive current for driving the actuator 130 in response to the position control signal of the heads 112 supplied by the microcontroller 124 so as to supply it to the voice coil of actuator 130. The actuator 130 moves the heads 112 over the disks 110 in response to the direction and level of the drive current supplied by the servo drive 128. The spindle motor drive 132 drives the spindle motor 134 to rotate the disks 110.

Figure 1:
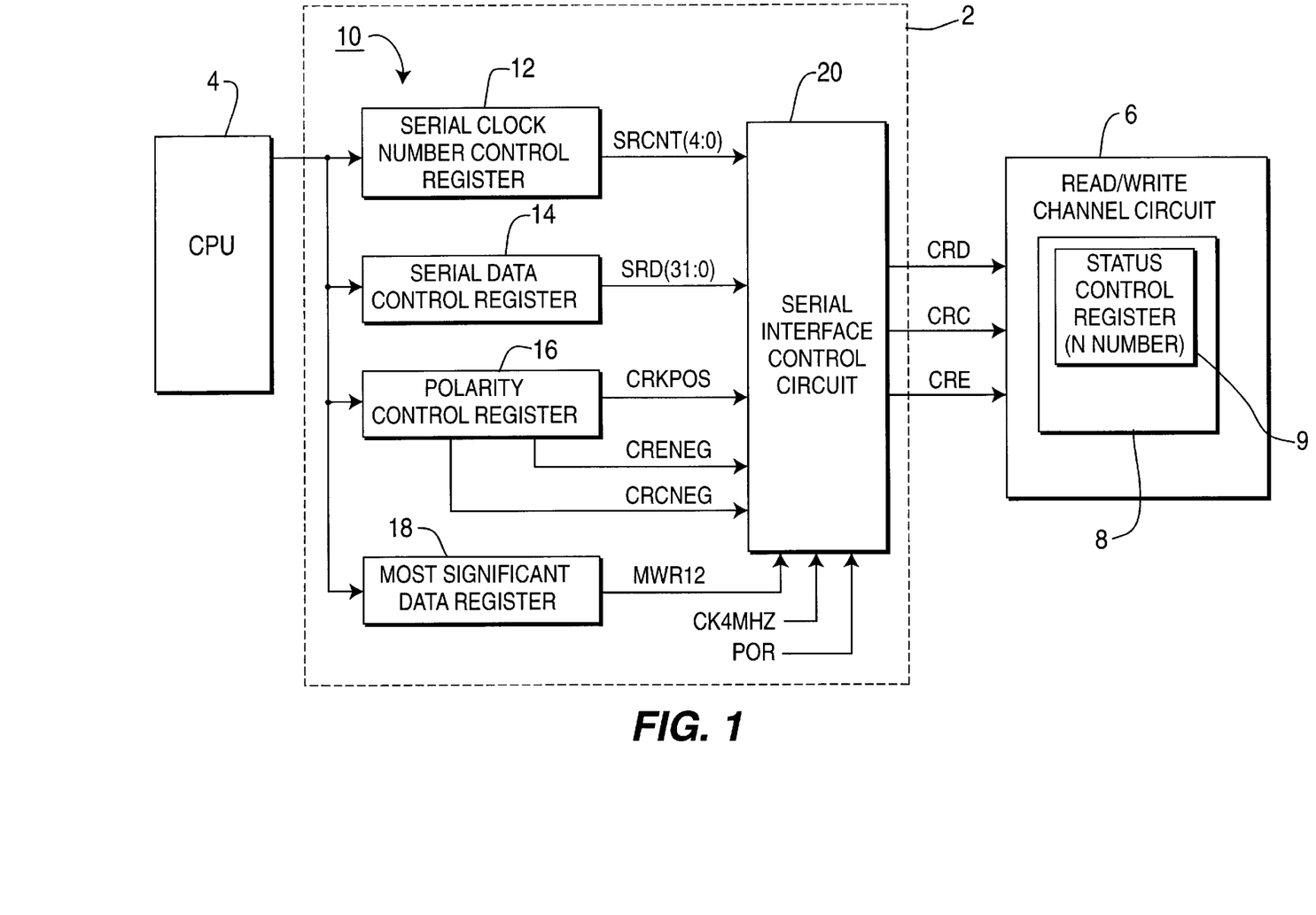
FIG. 1 is a block diagram illustrating a serial interface circuit according to the embodiment of the present invention.

Referring to FIG. 1, the serial interface circuit 2 according to the embodiment of the present invention is positioned between the CPU 4 and the read/write channel circuit 6, while the corresponding serial interface in FIG. 5 is positioned between the microcontroller 124 and the read/write channel circuit 118 in which the microcontroller 124 in FIG. 5 corresponds to the CPU 4 in FIG. 1.

Referring to FIG. 1, the serial interface circuit 2 adaptively supports the serial interface between CPU 4 and the read/write channel circuits 6 of various standards. The above read/write channel circuit 6 has a serial port 8 for performing the serial interface of a predetermined number of bits. The above serial port 8 has a status control register 9 consisting of n registers.

The serial interface circuit 2 consists largely of a signal generation control register unit 10 (hereinafter referred to as "bit control data loading unit") connected to the CPU 4 through bus and a serial interface control circuit 20 for performing the adaptive serial interface control of the read/write channel circuits 6 of various standards by converting the interface bit, controlling the polarity, and controlling the interface bit conversion according to the various signal loads of the bit control data loading unit 10.

The above bit control data loading unit 10 consists of a serial clock number control register 12, a serial data control register 14, a polarity control register 16 and a most significant data register 18. The serial clock number control register 12 stores the serial clock number information SRCNT(4:0) under the control of the CPU 4 to load into the serial interface control circuit 20. The serial data control register 14 stores the serial data control signal SRD (31:0) under the control of the CPU 4 to load into the serial interface control circuit 20. The polarity control register 16 produces various polarity and edge control signals, i.e. CRKPOS, CRENEG and CRCNEG, for controlling the polarities and edges of CRC (control register clock signal), CRE (control register enable signal) and CRD (control register data signal) supplied to a plurality of status control registers 9 within the read/write channel circuit 6 under the control of the CPU 4. The above CRKPOS among the polarity control signals represents a signal for selecting the data-related rising or falling edge of the control register clock signal CRC; the above CRENEG represents a signal for controlling polarity of the control register enable signal CRE, and the above CRCNEG represents a signal for controlling polarity of the control register clock signal CRC. The most significant data register 18 is selected under the control of the CPU 4 to produce the most significant register write signal MWR12 when writing.

Figure 2:
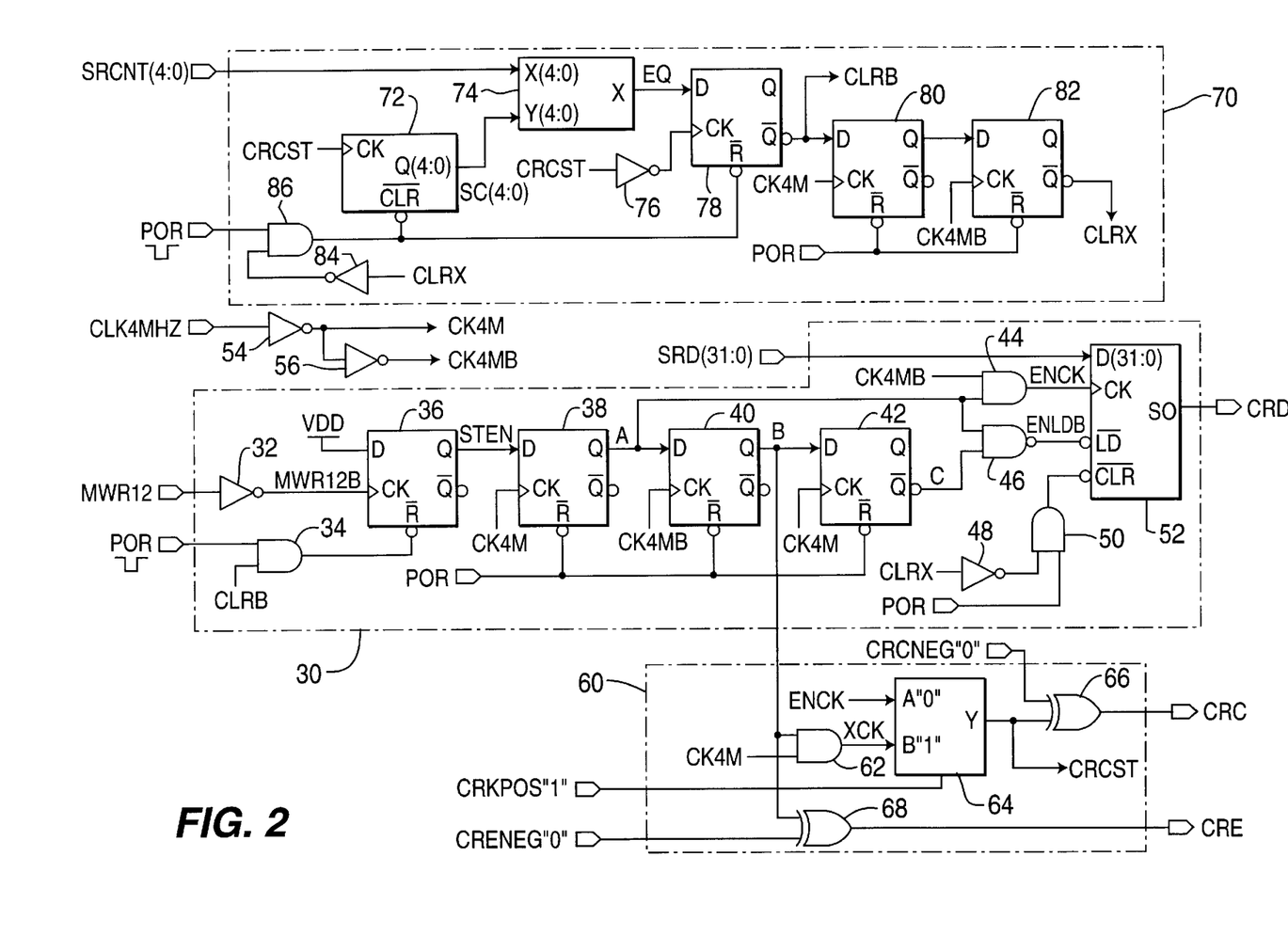
FIG. 2 is a detailed circuit diagram illustrating the serial interface control circuit as shown in FIG. 1.

Referring to FIG. 2, the serial interface control circuit 20 as shown in FIG. 1 consists largely of a data bit conversion unit 30, a signal polarity and edge control unit 60 and a bit conversion control unit 70.

The signal polarity and edge control unit 60 controls the polarities and edges of CRC and CRE supplied to the read/write channel circuit 6 by employing the polarity and edge control signals (CRKPOS, CRENEG, CRCNEG). The bit conversion control unit 70 calculates the above serial data bits and controls the bit conversion of the source data. The data bit conversion unit 30 performs the bit conversion and the serial conversion of the above serial data control signal SRD(31:0) according to the prescribed latch and the bit conversion controls of the write signals so as to output the control register data (CRD) as serial data.

Referring to FIGS. 1, 2, 3A and 3B, the operation of a preferred embodiment according to the present invention is explained in detail.

According to the embodiment of the present invention, the CPU 4 and the read/write channel circuit 6 can be serially interfaced up to 32 bits. The following operation description is based on the assumption that the bit number for the serial interface of the read/write channel circuit 6 is set to 9 bits. Under this assumption, the register numbers of the status control register 9 in the above read/write channel circuit 6 are 8(=23).

CPU 4 loads "8" as the serial clock number information SRCNT(4:0) on the serial clock number register 12 in which the SRCNT(4:0) "8" is equivalent to the bit number "9" for the serial interface because the initial value of the SRCNT (4:0) begins with "0". CPU 4 loads, for example, "00 00 00 7F(H)" sequentially from LSB(least significant bit) to MSB (most significant bit) as the serial data control signal SRD(3 1:0) of 32 bits on the serial data control register 14, and further, CPU 4 loads various polarity control information (CRKPOS="1", CRENEG="0", CRCNEG="0") for controlling the polarities of CRC, CRE and CRD supplied to a plurality of status control registers 9 within the read/write channel circuit 6 on the polarity control register 16.

Among the polarity control signals, CRKPOS is a signal for selecting the data-related rising or falling edge of CRC; CRENEG is a signal for controlling the polarity of CRE, and CRCNEG is a signal for controlling the polarity of CRC. CPU 4 selects the most significant data register 18 from among a plurality of data registers, whereby the most significant register write signal MWR12 is produced from the above most significant data register 18 when writing so as to be supplied to the serial interface control circuit 20.

Figure 3A:
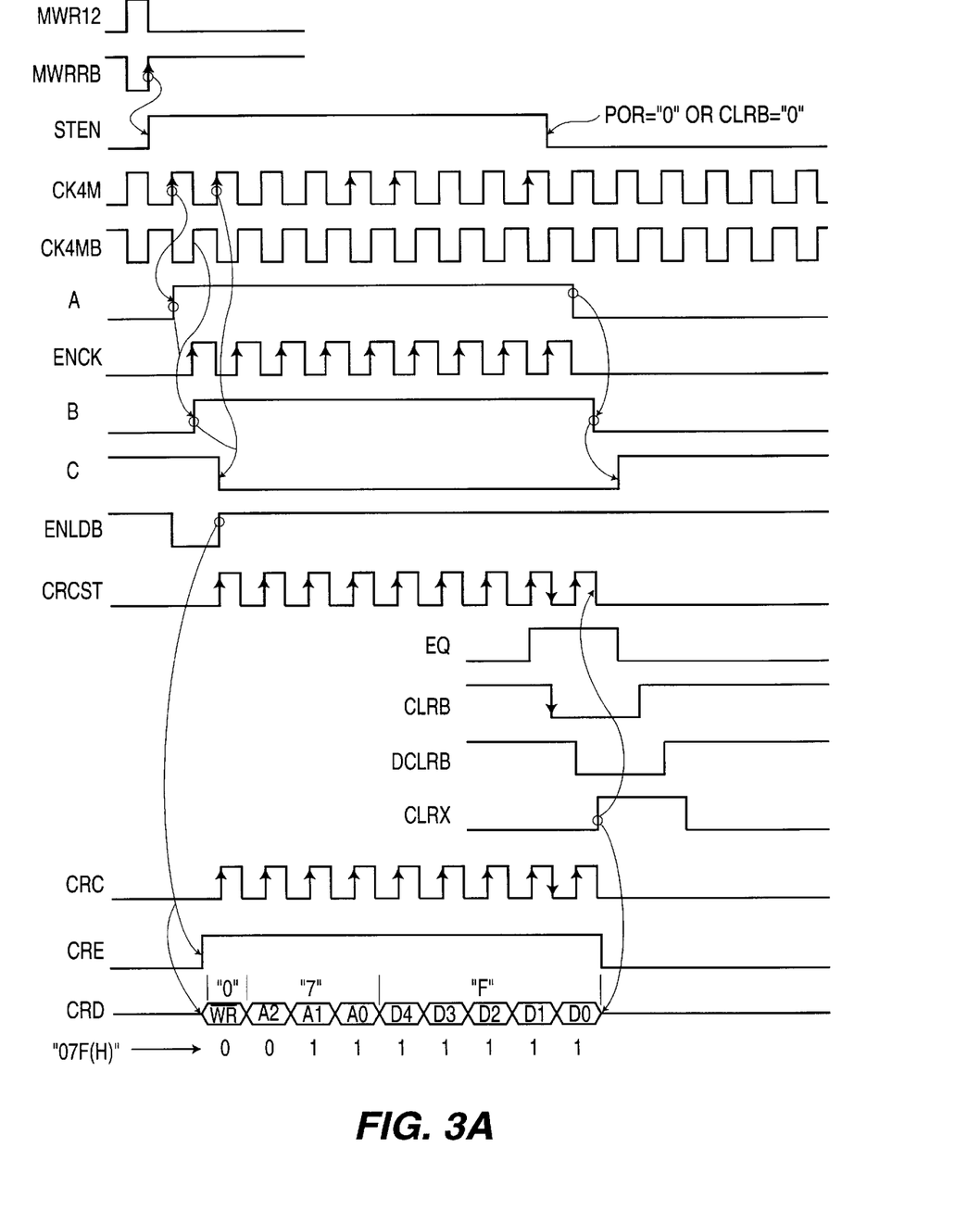
FIGS. 3A and 3B are timing charts according to the embodiment of the present invention.

The serial register loads addresses and data as shown in the bottom of FIG. 3A illustrating the serial data control signal CRD. In order to reduce the loads of software when loading the above addresses and data, the addresses are set to the most significant register, and the data are set to the least significant register according to the embodiment of the present invention. Thereafter, if data are first loaded on the least significant register, and then, addresses are set to the most significant register, all the addresses and data are written automatically. Therefore, when writing, the most significant register write signal MWR12 is produced from the most significant data register 18. The symbol number "12" of the above MWR12 represents 12th address designated as the address of the most significant register in ASIC applied to the embodiment of the present invention in which the most significant register write signal MWR12 is produced when CPU 4 designates the most significant data register 18.

When writing, the signals and data supplied to the serial interface control circuit 20 from the bit control data loading unit 10 as shown in FIG. 1 are summarized as follows: Serial clock number information SRCNT(4:0)="8", Serial data control signals SRD(31:0)="00 00 00 7F(H)", CRKPOS="1", CRENEG="0", CRCENG="0".

Except for the above signals and data, the signals supplied to the serial interface control circuit 20 are CK4MHZ of 4 MHz and the power reset signal POR supplied when resetting power as shown in FIG. 1. Referring to FIG. 2, the above clock CK4MHZ supplied to the serial interface control circuit 20 is inverted to 1st clock signal CK4M by the inverter 54 and to the 2nd clock signal CK4MB by the inverters 54 and 56. The 1st and 2nd clock signals CK4M and CK4MB are illustrated in FIG. 3A.

The most significant register write signal MWR12 supplied to the serial interface control circuit 20 is illustrated in FIG. 3A. The above most significant register write signal MWR12 is reversed by the inverter 32 of the interface bit conversion unit 30 within the serial interface control circuit 20. The reversed most significant register write signal MWR12B as shown in FIG. 3A is supplied as a clock signal to the clock terminal CK of a D-type flip-flop 36. The voltage $V_{DD}$ is continuously applied to the input terminal D. Accordingly, the D-type flip-flop 36 outputs the start enable signal STEN maintained logically 'high' in response to the rising edge of the reversed most significant register write signal MWR12B through the output terminal Q. Then, when the power reset control signal POR is activated logically 'low' or the clear signal CLRB is supplied to the reset terminal $\overline{R}$ through the AND gate 34, the start enable signal STEN is transitioned from the state of logically 'high' to the state of logically 'low'. The above start enable signal STEN is illustrated in FIG. 3A.

The D-type flip-flop 38 latches the above start enable signal STEN in response to the 1st clock signal CK4M to output the once latched 1st latch signal A through the output terminal Q. In the next step, the D-type flip-flop 40 latches the above 1st latch signal A in response to the 2nd clock signal CK4MB to output the twice latched 2nd latch signal B through the output terminal Q. In a further step, the D-type flip-flop 42 latches the above 2nd latch signal B in response to the 1st clock signal CK4M to output the three times latched 3rd latch signal C through the reverse output terminal $\overline{Q}$ The 1st latch signal A from the output terminal Q of the flip-flop 38 and the 2nd clock signal CK4MB are logically combined by the AND gate 44 to produce an enable clock signal ENCK supplied to the clock terminal CK of the parallel/serial converter 52. The 1st latch signal A and the 3rd latch signal C from the inverted output terminal $\overline{Q}$ of the flip-flop 42 are logically combined by the AND gate 46 to produce an enable load signal ENLDB supplied to the load terminal $\overline{LD}$ of the parallel/serial converter 52. FIG. 3A illustrates the waveforms of the above 1st, 2nd and 3rd latch signals A, B, C, the enable clock signal ENCK, and the enable load signal ENLDB.

Figure 3B:
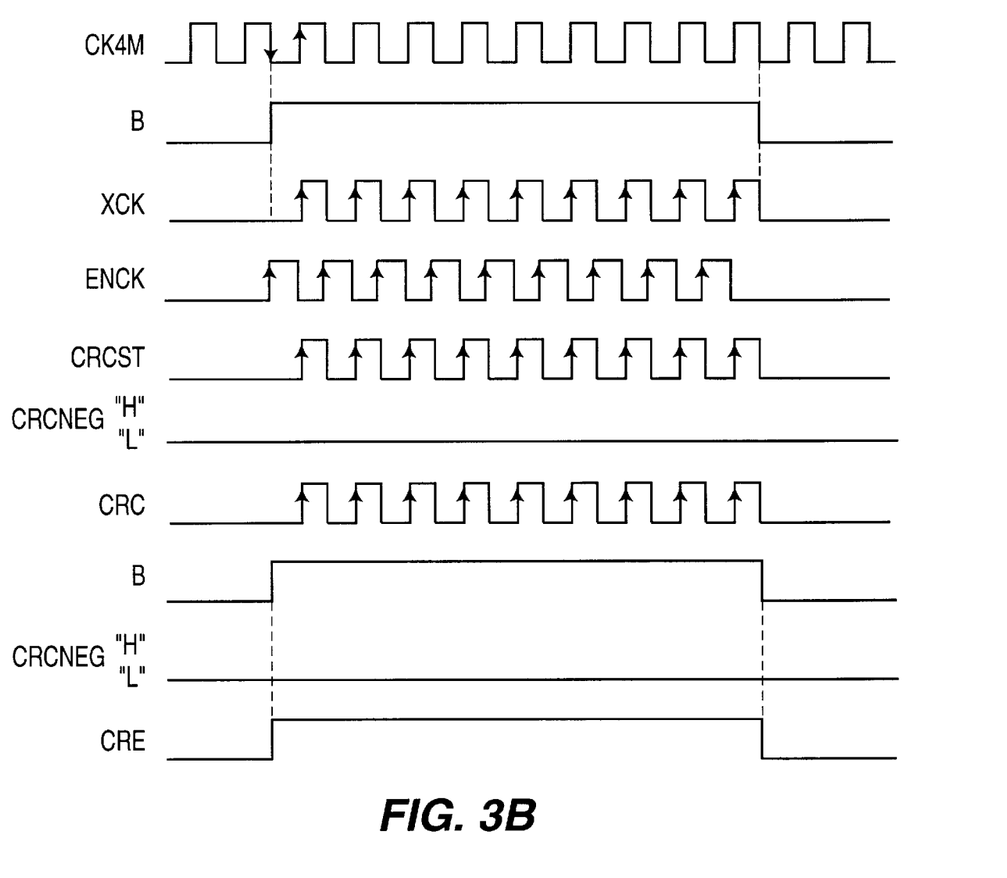
Figure 4:
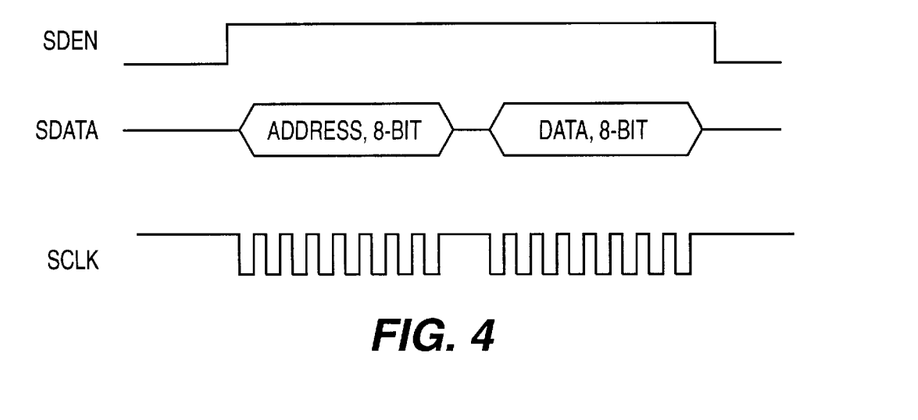
FIG. 4 is a transmission format diagram of an earlier serial port.

Besides, the 2nd latch signal B from the D-type flip-flop 40 is logically combined with the 1st clock signal CK4M by the AND gate 62 of the signal polarity and edge control unit 60 to produce an clock signal XCK supplied to the input terminal B of the multiplexer 64. The 1st clock signal CK4M, the 2nd latch signal B and the clock signal XCK are illustrated in FIG. 3B. The enable clock signal ENCK supplied to the clock terminal CK of the parallel/serial converter 30 is supplied to the input terminal A of the multiplexer 64. Then, the multiplexer 64 selects the clock signal XCK from the selecting terminal B in response to the signal CRKPOS="1" for selecting the data-related rising or falling edge of the control register clock signal CRC supplied to the read/write channel circuit 6. The output signal CRCST of the multiplexer 64 is supplied as a control register clock start signal to the clock terminal CK of the bit conversion control unit 70. Further, the output signal CRCST is exclusively combined with the signal CRCNEG= "0" for controlling the polarity of the control register clock signal CRC by the exclusive OR gate 66 to output a control register clock signal CRC supplied to the read/write channel circuit 6. The waveform of the control register clock signal CRC is illustrated in FIG. 3B, which shows nine rising edges.

The 2nd latch signal B from the D-type flip-flop 40 is logically combined with the signal CRENEG="0" for controlling the polarity of the control register enable signal CRE by the exclusive OR gate 68 to output a control register enable signal CRE with the waveform of FIG. 3B supplied to the read/write channel circuit 6.

Besides referring to FIG. 2, the counter 72 of the bit conversion control unit 70 counts the clocks of the control register clock start signal CRCST from the multiplexer 64 of the signal and edge control unit 60 and supplies the counted value SC(4:0) to the input terminal Y(4:0) of the comparator 74. When the counted value SC(4:0) is equal to the serial clock number information SRCNT(4:0)="8" transmitted from the serial clock number control register 12 and supplied to the input terminal X(4:0), the comparator 74 outputs the signal EQ as shown in FIG. 3A through the output terminal X. The D-type flip-flop 78 latches the above signal EQ in response to the control register clock start signal CRCST inverted by the inverter 76 and outputs the 1st clear signal CLRB as shown in FIG. 3A. The above 1st clear signal CLRB is supplied to the reset terminal $\overline{R}$ of the D-type flip-flop 36 through the inverter 34 of the serial bit conversion unit 30. At this time, the start enable signal STEN transitions to the logically 'low' state. The timing chart of FIG. 3A shows that the above start enable signal STEN begins to transition to the logically 'low' state at the falling edge of the 1st clear signal CLRB.

The above 1st clear signal CLRB is further supplied to the D-type flip-flop 80. The D-type flip-flop 80 latches the 1st clear signal CLRB in response to the 1st clock signal CK4M and outputs a signal DCLRB further supplied to the D-type flip-flop 82. The D-type flip-flop 82 latches the above signal DCLRB in response to the 2nd clock signal CK4MB and outputs the 2nd clear signal CLRX through the reverse output terminal $\overline{Q}$ The 2nd clear signal CLRX is supplied to the clear terminal $\overline{CLR}$ of the counter 72 and to the reset terminal $\overline{R}$ of the D-type flip-flop 78 through the inverter 84 and the AND gate 86, and further supplied to the clear terminal $\overline{CLR}$ of the parallel/serial converter 52 through the inverter 48 and the AND gate 50 within the serial bit conversion unit 30. The 2nd clear signal CLRX causes the counter 72 to stop outputting the counter signal SC(4:0). (Namely, the 2nd clear signal CLRX clears the control register clock start signal CRCST input to the counter 72). The 2nd clear signal CLRX also causes the parallel/serial converter 52 to stop outputting the control register data CRD. The timing chart of FIG. 3A shows that the 2nd clear signal CLRX clears the control register clock start signal CRCST input to the counter 72 at the rising edge of the above CLRX so that the parallel/serial converter 52 stops the outputting of the control register data CRD.

Referring to the serial bit conversion unit 30 as shown in FIG. 2, the serial data control signal SRD(31:0) is supplied to the input terminal D(31:0) of the parallel/serial converter 52. The above serial data control signal SRD(31:0) represents "00 00 00 7F". Accordingly, the parallel/serial converter 52 loads the serial data control signal SRD(31:0) at the rising edge of the enable load signal ENLDB output from the NAND gate 46 as shown in FIG. 3A, and converts the parallel input, i.e. SRD(31:0) into the serial output in response to the enable clock signal ENCK from the AND gate 44. Then, when the 2nd clear signal CLRX or the power reset signal POR is supplied to the clear terminal $\overline{CLR}$, the parallel/serial converter 52 is reset. As the result, the control register data CRD, output of the parallel/serial converter 52, represents "07F(H)" as shown in FIG. 3A. The CRD is a serial data of 9 bits of which the upper one bit $\overline{WE}$ is a write enable signal activated logically 'low', and the subsequent three bits A2=A0 represent the address of eight status control registers 9. The last five bits D4=D0 represent a data value stored in the above address.

The power reset signal POR as shown in FIG. 2 is a signal activated logically 'low' when resetting power, supplied to the reset terminals $\overline{R}$ of the D-type flip-flops 36, 38, 40, and 42 of the data bit conversion unit 30, the clear terminal $\overline{CLR}$ of the parallel/serial converter 52, the counter 72, and the D-type flip-flops 74, 78, 80, and 82 respectively so as to reset (or clear) the respective elements.

Referring to FIG. 2 and 5, the serial interface control circuit 20 outputs the control register clock signal CRC, the control register enable signal CRE and the control register data CRD supplied to the read/write channel circuit 6. The timing chart illustrating the control register clock signal CRC, the control register enable signal CRE and the control register data CRD as shown in FIG. 3A shows that each of the clock enable signal and the data is a signal adjusted to make a serial interface of nine bits.

Although the present invention has been explained with reference to the specific embodiment in case of 9 bit serial interfacing between CPU and the read/write channel circuit 6, it is apparent to those skilled in the art that the serial interface of any bit number within 32 bits (=$2^5$) is possible. Hence, any bit number within 2n bits enables the serial interface control between CPU and the read/write channel circuit.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A serial interface circuit for interfacing serial data between a control unit and a read/write channel circuit of a disk drive, comprising:

a bit control data loading unit for loading the serial data to interface with the read/write channel circuit of a specified standard and bit control data related to a transfer control signal of said serial data under the control of said control unit; and a serial interface control circuit for supplying said serial data to said read/write channel circuit by performing a bit conversion to adapt said serial data, controlling the polarity and edge of said transfer control signal, and for controlling said bit conversion by employing said loaded bit control data;

said bit control data loading unit comprising:
a serial clock number control register for storing and loading a serial clock number for transferring said serial data to said read/write channel circuit under the control of said control unit;
a serial data control register for storing and loading source data for transferring said serial data to said read/write channel circuit;
a polarity and edge control register for storing and loading control values for controlling the polarity and edge of said transfer control signal under the control of said control unit; and a write signal storing register for loading the write signal when writing said serial data into said read/write channel circuit under the control of said control unit.

2. A serial interface circuit for interfacing serial data between a control unit and a read/write channel circuit of a disk drive, comprising:

a bit control data loading unit for loading the serial data to interface with the read/write channel circuit of a specified standard and bit control data related to a transfer control signal of said serial data under the control of said control unit; and a serial interface control circuit for supplying said serial data to said read/write channel circuit by performing a bit conversion to adapt said serial data, controlling the polarity and edge of said transfer control signal, and for controlling said bit conversion by employing said loaded bit control data;

said serial interface control circuit comprising:

a signal polarity and edge control unit for controlling the polarity and edge of the transfer control signals supplied to said read/write channel circuit by employing the polarity and edge control values of said interface control signals;

a bit conversion control unit for calculating said serial data bits and controlling said bit conversion of said source data; and a data bit conversion unit for performing the bit conversion and the serial conversion of said source data, and for outputting said serial data according to the prescribed latch and the bit conversion control of said write signal.

3. A serial interface circuit for interfacing serial data between a control unit and a read/write channel circuit of a disk drive, comprising:

a bit control data loading unit for loading the serial data to interface with the read/write channel circuit of a specified standard and bit control data related to a transfer control signal of said serial data under the control of said control unit; and a serial interface control circuit for supplying said serial data to said read/write channel circuit by performing a bit conversion to adapt said serial data, controlling the polarity and edge of said transfer control signal, and for controlling said bit conversion by employing said loaded bit control data;

said bit control data loading unit comprising:

a serial clock number control register for storing and loading a serial clock number for transferring said serial data to said read/write channel circuit under the control of said control unit;

a serial data control register for storing and loading source data for transferring said serial data to said read/write channel circuit;

a polarity and edge control register for storing and loading control values for controlling the polarity and edge of said transfer control signal under the control of said control unit; and a write signal storing register for loading the write signal when writing said serial data into said read/write channel circuit under the control of said control unit; and said serial interface control circuit comprising:

a signal polarity and edge control unit for controlling the polarity and edge of the transfer control signals supplied to said read/write channel circuit by employing the polarity and edge control values of said interface control signals;

a bit conversion control unit for calculating said serial data bits and controlling said bit conversion of said source data; and a data bit conversion unit for performing the bit conversion and the serial conversion of said source data, and for outputting said serial data according to the prescribed latch and the bit conversion control of said write signal.

* * * * *